United States Patent
Sui et al.

(10) Patent No.: US 10,537,829 B2
(45) Date of Patent: Jan. 21, 2020

(54) EMULSION PREVENTER FOR COMPLETION BRINES

(71) Applicant: M-I L.L.C., Houston, TX (US)

(72) Inventors: Changping Sui, Houston, TX (US); Pawilai Chinwangso, Houston, TX (US); Hui Zhang, Sugar Land, TX (US); Steven Young, Cypress, TX (US)

(73) Assignee: M-I L.L.C., Houston, TX (US)

( * ) Notice: Subject to any disclaimer, the term of this patent is extended or adjusted under 35 U.S.C. 154(b) by 455 days.

(21) Appl. No.: 15/296,505

(22) Filed: Oct. 18, 2016

(65) Prior Publication Data

US 2017/0106311 A1   Apr. 20, 2017

Related U.S. Application Data

(60) Provisional application No. 62/369,950, filed on Aug. 2, 2016, provisional application No. 62/243,980, filed on Oct. 20, 2015.

(51) Int. Cl.

| | |
|---|---|
| *B01D 17/04* | (2006.01) |
| *C02F 1/68* | (2006.01) |
| *E21B 43/38* | (2006.01) |
| *C02F 103/10* | (2006.01) |
| *C02F 101/32* | (2006.01) |
| *E21B 43/26* | (2006.01) |
| *C09K 8/58* | (2006.01) |
| *C09K 8/584* | (2006.01) |

(52) U.S. Cl.
CPC ............ *B01D 17/047* (2013.01); *C02F 1/686* (2013.01); *C09K 8/584* (2013.01); *E21B 43/385* (2013.01); *C02F 2101/325* (2013.01); *C02F 2103/10* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 2009/0149557 A1 | 6/2009 | Talingting-Pabalan et al. | |
| 2013/0261227 A1* | 10/2013 | Nguyen | C08L 71/02 523/403 |
| 2013/0324445 A1* | 12/2013 | Quintero | C09K 8/68 507/211 |
| 2014/0213668 A1 | 7/2014 | Meyer | |
| 2015/0329767 A1* | 11/2015 | Vaughn | C09K 8/602 166/305.1 |

FOREIGN PATENT DOCUMENTS

| | | |
|---|---|---|
| WO | 0123703 A1 | 4/2001 |
| WO | 2013-064650 A1 | 5/2013 |
| WO | 2013-158989 A1 | 10/2013 |

OTHER PUBLICATIONS

International Search Report and Written Opinion dated Jan. 11, 2017, in related International Application No. PCT/US2016/057790 (11 pages).
PCT Notification of Transmittal of the International Search Report and Written Opinion of the International Searching Authority, or the Declaration (PCT Rule 44.1) dated Jan. 26, 2017, in related International Application No. PCT/US2016/057791 (12 pages).
International Preliminary Report on Patentability for the equivalent International patent application PCT/US2016/057791 dated May 3, 2018.

\* cited by examiner

*Primary Examiner* — John J Figueroa
(74) *Attorney, Agent, or Firm* — Osha Liang LLP

(57) ABSTRACT

Emulsion-preventing compositions may contain one or more sorbitan esters; and one or more non-ionic surfactants; where the ratio of the one or more sorbitan esters to the one or more non-ionic surfactants is in the range of 1:1 to 1:5. Methods may include contacting an emulsion with a treatment fluid, the treatment fluid containing one or more sorbitan esters and one or more non-ionic surfactants, where the ratio of the one or more sorbitan esters to the one or more non-ionic surfactants is in the range of 1:1 to 1:5; and separating the emulsion into an aqueous phase and an oleaginous phase.

14 Claims, No Drawings

EMULSION PREVENTER FOR COMPLETION BRINES

CROSS-REFERENCE TO RELATED APPLICATIONS

This Application claims priority, pursuant to 35 U.S.C. § 119(e) to U.S. Provisional Application Nos. 62/243,980 filed on Oct. 20, 2015, and 62/369,950 filed on Aug. 2, 2016, both of which are incorporated by reference in their entirety.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Once injected, wellbore fluids may be subjected to various contaminants, including drill cuttings, mud residues, and various connate fluids. The presence of contaminants and residues in the wellbore may also be composed of chemical phases that are distinct from the injected fluid and may form emulsions or sludge when admixture occurs. Emulsions produced may be detrimental to wellbore operations, and can result in formation damage, adverse changes in fluid rheology, or introduce additional impurities into produced hydrocarbons. When the wellbore fluid is a fracturing fluid, viscous emulsions may form when oils are contacted downhole, which may inhibit the ability to pump the fluids further into a formation, increasing the energy required and raising operating costs.

SUMMARY

In one aspect, embodiments disclosed herein relate to a composition that includes one or more sorbitan esters; and one or more nonionic surfactants, wherein the volumetric ratio of the one or more sorbitan esters to the one or more nonionic surfactants is in the range of 1:1 to 1:5.

In another aspect, embodiments disclosed herein relate to a method that includes emplacing a wellbore fluid into a wellbore, the wellbore fluid including a base fluid; one or more sorbitan esters; one or more nonionic surfactants; and wherein the volumetric ratio of the one or more sorbitan esters to the one or more nonionic surfactants is in the range of 1:1 to 1:5.

In yet another aspect, embodiments disclosed herein relate to a method that includes contacting an emulsion with a treatment fluid and separating the emulsion into an aqueous phase and an oleaginous phase. The treatment fluid may include one or more sorbitan esters, and one or more nonionic surfactants, wherein the volumetric ratio of the one or more sorbitan esters to the one or more nonionic surfactants is in the range of 1:1 to 1:5.

Other aspects and advantages of the claimed subject matter will be apparent from the following description and the appended claims.

DETAILED DESCRIPTION

In one aspect, non-emulsifying surfactants of the present disclosure may be used as a wellbore fluid additive that prevents or modifies the degree of emulsion formation between injected fluids and fluids present downhole. Wellbore fluids in accordance with the present disclosure may be formulated with a surfactant package that maintains the interfacial boundary between injected fluids and reservoir crude oil and other oleaginous fluids. In some embodiments, the non-emulsifying surfactant packages may include a predetermined ratio of one or more nonionic surfactants and sorbitan esters. Further, surfactant compositions of the present disclosure may also be formulated from components that meet the requirements for use in environmentally sensitive applications.

The occurrence of emulsions is a natural phenomenon of oil extraction from reservoirs containing systems of oil, water, and gas. When emulsions are formed with aqueous fluids, particularly those with high salt content, the emulsions exhibit viscosities greater than that of the dehydrated oil. For example, emulsions and sludge may form between crude oils and aqueous fluids due to the presence of hydrocarbon components such as asphaltenes, resins, and asphaltogenic acids. The presence of emulsions can affect the sizing and power output of the pumping system, the transfer and storage of petroleum mixtures, and may also generate problems of encrustation and corrosion in oil pipelines carrying the outflow. Emulsion creation may also increase in the later stages of production where the oil-water contact approaches the bottom of the wellbore. This may lead to increases in turbulent flow from the formation of water-in-oil emulsions.

Controlling emulsion formation may decrease the total cost of operation by reducing energy consumption, pump stress and failures, and need for topside emulsion breaker chemicals. Further, partitioning aqueous and oleaginous fluids may decrease the cost of separating captured crude oils from wellbore wastes, which may obviate the need to transport of the emulsion to the surface for treatment, in addition to reducing the amount of emulsified fluid that would otherwise require time and expense to transport and separate.

In order to combat problems associated with emulsion formation, non-emulsifying surfactant packages in accordance with the present disclosure may be used during wellbore operations in wells that are generating mixtures of aqueous and oleaginous fluids. Non-emulsifying surfactants may aid the separation of commingled fluids by partitioning produced hydrocarbon fluids from injected fluids and/or connate fluids produced during flowback. Use of non-emulsifying surfactants may also aid the maintenance of phase separation between aqueous and oleaginous phases, and decrease pumping pressure required to inject and remove emulsified fluids.

As used herein, the term "environmentally friendly" is defined as chemicals or formulations that can pass the most stringent environmental testing criteria as described below. Furthermore, as used herein, the term "environmentally unfriendly" is defined as chemicals or formulations that do not pass the most stringent environmental testing criteria. Specifically, one of the measures of sample toxicological test is marine biodegradation on a component level as outlined in the Organization for Economic Cooperation and Development, Procedure OECD 306 or BODIS. In the North Sea offshore environment, OSPAR prescreening scheme is followed to determine if a substance would be a candidate for "substitution warning" classification (i.e., chemical substances identified as candidates for substitution). The ecotoxicity test requirements are: bioaccumulation, biodegradation in sea water or fresh water, and toxicity testing on specific North Sea species such as *Skeletonema costatum*, *Acartia tonsa*, and juvenile turbot. In order for a chemical to be used without any implications offshore in the North Sea it must satisfy two of the following three criterion:

(1) Biodegradation: >60% in 28 days as measured by OECD 306 or any other OSPAR-accepted marine protocols, or in the absence of valid results for such tests, >60% in 28 days as measured by OECD 301B, 301C, 301D, 301F, 310, Freshwater BODIS or >70% in 28 days as measured by OECD 301A, 301E;

(2) Bioaccumulation: a bioconcentration factor (BCF)<100 determined according to OECD 305 or ASTM E 1022 guidelines, or log $P_{ow}$ (partition coefficient of a substance between N-octanol and water, measured or calculated according to the HOCNF Guidelines or an OECD 107 test)≤3 and molecular weight >700, or if the conclusion of a weight of evidence expert judgment under Appendix 3 of OSPAR Agreement 2008-5 is positive; and (3) Aquatic Toxicity: LC50>10 mg/l or EC50>10 mg/l; if toxicity values >10 mg/l are derived from limit tests to fish, actual fish LC50 data should be submitted in accordance with OSPAR Guidelines for Completing the HOCNF. In particular embodiments, each of the three criteria are met.

At present (and for the last 30 years), the geographic location with the most stringent environmental and discharge testing criteria for well treatment operation is the North Sea, but the definition of either of these terms should in no way be limited to any past, present or future North Sea environmental testing criteria. Further, the test criteria also in no way limit the geographical region of use of the fluid, but provide an indication of the environmental friendliness of a product (or fluid containing a product).

As solutions are found useful to provide certain functions in treatment fluids, when used in the North Sea off shore, or other highly regulated off shore environments, stringent requirements for particular off shore environments are met. Any oilfield chemical that is used in the North Sea is registered with the respective country's regulatory body which assigns a rating or color classification to each chemical depending on its environmental and toxicological characteristics. Based on the chemical rating or color classification, the chemical will either be regarded as more or less environmentally friendly or unfriendly. In the North Sea, the classification techniques vary. For example, Norway and Denmark follow color classification for chemical products, United Kingdom (UK) follows color and letter ratings for organic and inorganic chemical products, respectively, and Netherlands follows letter categories. Thus, countries within a small geographic region have customized their classification system based upon a desire to differentiate environmentally friendly and unfriendly chemical products. Regardless of the classification system, each of the North Sea countries (Norway, Denmark, Netherlands and United Kingdom) employs the same three ecotoxicology tests criteria described above to differentiate chemical products.

When each component in a chemical product passes the above mentioned criteria, then typically the whole product can be termed as "Green" or PLONOR (Pose Little Or NO Risk) in Norway and Denmark. When all the components in a product meets two of the criteria, then the product can receive "Yellow" classification in Norway and Denmark, and still considered as environmentally friendly. If the biodegradation value in seawater or fresh eater is <20% after 28 days for any of the components or if toxicity (LC50 or EC50) of an inorganic component is less than 1 mg/L, then the chemical products can receive "Red" classification or substitution warning (i.e., environmentally unfriendly classification in the North Sea). Table 1, below, summarizes the North Sea regulations. As a rule of thumb, two or more "Good" results means that the chemical compounds are acceptable, while two or more "Bad" results means that the chemical compound is unacceptable. However, a chemical compound having less than 20% biodegradation alone or an LC50 or EC50 of less than 1 mg/L may end up with environmentally unfriendly classification in the North Sea and could be unacceptable.

TABLE 1

North Sea Regulations Interpretation

| Test | Biodegradation | | | Bioaccumulation | | Toxicity - EC/LC50 | | |
|---|---|---|---|---|---|---|---|---|
| Unit | % | | | Log Pow | | mg/L | | |
| Result | <20 | 20-60 | >60 | <3 | >3 | <1 | <10 | >10 |
| Inference | Very bad | Bad | Good | Good | Bad | Very bad | Bad | Good |

Surfactant packages in accordance with the present disclosure are water-soluble or water-dispersible, and may be used as non-emulsifying additives, demulsifiers, viscosity reducers, and/or emulsion modifiers. In one or more embodiments, non-emulsifying surfactant packages are a mixture of one or more surfactants that may be added to an aqueous wellbore fluid to prevent the creation of an emulsion or dispersion by, for example, maintaining the interfacial tension between the two liquid phases. It is also envisioned that surfactant packages in accordance with the present disclosure may also contribute to friction reduction during pressure pumping treatments in wells where the presence of oleaginous fluids is not detected or anticipated.

In one or more embodiments, non-emulsifying surfactants in accordance with the present disclosure may be formulated as part of a wellbore fluid injected during completions. Completion fluids are solids-free, or low-solid, liquids used to "complete" an oil or gas well prior to initiation of production, such as during setting screens production liners, packers, downhole valves or shooting perforations into the producing zone. Completions fluids may be used to control a well should downhole hardware fail, without damaging the producing formation or completion components. In some embodiments, completion fluids may be brines such as chlorides, bromides, and formates, but may also be any fluid of proper density and flow characteristics. Other applications include formulation as a reservoir drill-in fluid that is used in drilling operations through hydrocarbon producing intervals of a wellbore to minimize formation damage. Still other applications include the treatment of fracturing fluids or acid treatments to prevent the formation of emulsions and sludges with hydrocarbon fluids produced from the formation.

In another aspect, embodiments disclosed herein may relate to methods for breaking formed emulsions in mud slop and other waste waters, separating the treated fluids into oleaginous and clarified aqueous phases during crude oil production and/or refinery processes. Non-emulsifying surfactant packages may also be used to remove an oil or water phase from waste streams or breaking down viscosity of sludges in order to promote solids separation and removal. Following treatment processes of the present disclosure, the resulting water phase may be clarified to a sufficiently high purity to meet local regulatory limits for discharge to the environment, particularly prior to overboard discharge.

In one or more embodiments, the clarified aqueous phase of a treated wellbore fluid may be separated and recycled for use in future wellbore operations. For example, recovered aqueous fluids may be treated with a surfactant package in accordance with the present disclosure, separated, and re-injected directly or supplemented with additional surfactant prior to use. In some embodiments, non-emulsifiers may also be used to break formed emulsions into their constituent phases, which may find utility in certain operations such as chemical analysis of oil and synthetic muds and to treat produced hydrocarbons.

Nonionic Surfactants

In one or more embodiments, surfactant packages in accordance with the present disclosure may include a nonionic surfactant. Nonionic surfactants may promote coalescence of oleaginous phase droplets and aid transport to the phase boundary to maintain the separation between aqueous and oleaginous phases.

In one or more embodiments nonionic surfactants in accordance with the present disclosure may include compounds that act as wetting agents or coagulants that act to aggregate solids present in a wellbore fluid. Nonionic surfactants in accordance with the present disclosure may include primary alcohol alkoxylates, secondary alcohol alkoxylates, fatty alcohol alkoxylates, alkoxylated fatty acids, fatty acid ester soaps, alkylphenol ethers, alkyl phosphates, silicone glycol copolymers, phosphate esters, glycosides such as cetearyl glucoside, alkyl polyglycosides, and alkoxylated triglycerides, and mixtures thereof. Further, one of ordinary skill would appreciate that this list is not exhaustive, and that other surface active agents, such as ethylene oxide polymers, copolymers and block copolymers of poly(ethylene oxide-propylene oxide) (PEO-PPO) with different ethylene oxide (EO) to propylene oxide (PO) molar ratios, and poloxamers, may be used in accordance with embodiments of the present disclosure.

In some embodiments, nonionic surfactants may include alkyl polyglycosides having the general formula:

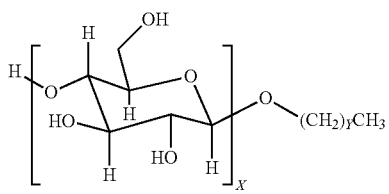

where the oligosaccharide portion contains one or more repeat units X, which may vary in number from 1 to 4. The alkyl portion of the alkyl polyglycoside may include a hydrocarbon tail containing a carbon chain length that may vary from 4 to 25 (with Y ranging from 3-24). In another embodiment, the carbon chain length may range from C8-C10 (Y values of 7-9). Suitable alkyl polyglycosides may include, for example, alkyl polyglucosides such as DESULF GOS-P-60WCG™ (DeForest) or Triton CG 110™ (Dow Chemical).

In one or more embodiments, the nonionic surfactant may also be selected on the basis of have a hydrophilic/lipophilic balance (HLB) of the surfactant. The term "HLB" (Hydrophilic Lipophilic Balance) refers to the ratio of the hydrophilicity of the polar groups of the surface-active molecules to the hydrophobicity of the lipophilic part of the same molecules. In some embodiments, the HLB may be within the range of 7-11, or from 8-10.

In one or more embodiments, nonionic surfactants in accordance with the present disclosure may be formulated as part of a concentrated surfactant package that may be diluted during application. Nonionic surfactants may be incorporated into a surfactant package at about 50 to about 99.9 percent by volume (vol %) of the surfactant package in some embodiments, and from 60 vol % to 90 vol % in other embodiments.

In some embodiments, nonionic surfactants may be combined directly with a wellbore fluid, alone or in combination with other surfactants. Nonionic surfactants in accordance with the present disclosure may be used at about 0.01 vol % to about 5 vol % of wellbore fluid in some embodiments, and from 0.05 vol % to 3 vol % in other embodiments. However, one of ordinary skill in the art would appreciate that in other embodiments, more or less may be used.

Sorbitan Esters

In one or more embodiments, surfactant packages in accordance with the present disclosure may include a sorbitan ester surfactant. Sorbate ester surfactants in accordance with the present disclosure may be selected based on the environmental safety constraints in place in the given region in which the wellbore operation takes place, and the average molecular weight ($M_w$) of the nonionic surfactant may be greater than 700 Da in some embodiments.

Soribitan esters in accordance with the present disclosure may include alkoxylated sorbitan esters in which hydroxyl groups of the sorbitan nucleus are modified to include at least one C8-C22 alkyl or alkenyl ether, such as ethylene glycol, polypropylene glycol, and mixtures, polymers, copolymers, and block copolymers thereof, and a mono-, di-, or tri-esters of C8-C22 alkyl or alkenyl fatty acids. For example, sorbitan ester surfactants may be a polysorbate, such as polyoxyethylene (20) sorbitan monolaurate, polyoxyethylene (20) sorbitan monoplamitate, polyoxyethylene (20) sorbitan monooleate, and polyoxyethylene (20) sorbitan monostearate. Sorbitan esters may also include sorbitans esterified with mono-, di-, tri-, or tetra-esters of C8-C22 alkyl or alkenyl fatty acids, such as sorbitan monolaurate, sorbitan dialurate, sorbitan monopalmitate, sorbitan dipalmitate, sorbitan monooleate, sorbitan dioleate, and the like. In some embodiments, sorbitan esters may include Span™ 40, Span™ 80, and Tween™ 80 nonionic surfactant commercially available from Croda International.

In one or more embodiments, sorbitan ester surfactants in accordance with the present disclosure may be formulated as part of a concentrated surfactant package that may be diluted during application. Sorbitan ester surfactants may be incorporated into a surfactant package at about 5% to about 50 vol % of the surfactant package in some embodiments, and from 10 vol % to 30 vol % in other embodiments.

Sorbitan esters in accordance with the present disclosure may be used at about 0.01 vol % to about 5 vol % of wellbore fluid in some embodiments, and from 0.05 vol % to 3 vol % in other embodiments. However, one of ordinary skill in the art would appreciate that in other embodiments, more or less may be used.

Amphoteric Surfactants

In one or more embodiments, surfactant packages in accordance with the present disclosure may include an optional amphoteric surfactant. Amphoteric surfactants may interact at an oil/water interface through a mixture of electrostatic and steric effects, which can result in enhanced phase separation. For example, amphoteric surfactants may reduce the surface charge sufficiently to produce oil droplet coalescence and separation.

In one or more embodiments, the amphoteric surfactant may be selected from C8-C22 alkyl amidopropyl sultaines, C8-C22 alkyl amidopropyl betaines, C8-C22 alkenyl amidopropyl betaines, alkyl amphohydroxypropyl sulfonates, alkyl ampho(di)acetates, and mixtures thereof. In some embodiments, the amphoteric surfactant may be a commercially available amphoteric wetting agent such as CAS 50 available from commercially available from Croda International, or Mirataine Bet 0-30, a betaine surfactant, commercially available from Rhodia.

In one or more embodiments, amphoteric surfactants in accordance with the present disclosure may be formulated as part of a concentrated surfactant package that may be diluted during application. Amphoteric surfactants may be incorporated into a surfactant package at about 5 vol % to about 50 vol % of the surfactant package in some embodiments, and from 10 vol % to 30 vol % in other embodiments.

Amphoteric surfactants in accordance with the present disclosure may be used at 0.01 vol % to about 5 vol % of wellbore fluid in some embodiments, and from 0.05 vol % to 3 vol % in other embodiments. However, one of ordinary skill in the art would appreciate that in other embodiments, more or less may be used.

Surfactant compositions of the present disclosure may include a surfactant blend of one or more sorbitan esters and one or more nonionic surfactants that are mixed in defined volumetric ratios, wherein the volumetric ratio of the one or more sorbitan esters to the one or more nonionic surfactants is within the range of 0.5:1 to 1:10 in some embodiments and from 1:1 to 1:5 in other embodiments.

In one or more embodiments, surfactant composition may include a surfactant blend of one or more sorbitan esters, one or more nonionic surfactants, and one or more amphoteric surfactants, wherein the volumetric ratio of the sorbitan ester:nonionic surfactant:amphoteric surfactant is in the range of 1:1:1 to 1:5:3. In some embodiments, the ratio of sorbitan ester:nonionic surfactant:amphoteric surfactant may be 1:2.5:1.6.

Mutual Solvent

In one or more embodiments, non-emulsifying surfactant packages may be formulated to contain a mutual solvent, examples of which may include glycol ethers or glycerol. The use of the term "mutual solvent" includes its ordinary meaning as recognized by those skilled in the art, as having solubility in both aqueous and oleaginous fluids. In some embodiments, the mutual solvent may be substantially completely soluble in each phase while in select other embodiment, a lesser degree of solubilization may be acceptable. Illustrative examples of such mutual solvents include for example, alcohols, linear or branched such as isopropanol, methanol, glycerol, or glycols.

Glycols in accordance with the present disclosure may include one or more polyols containing 2 to 8 carbon atoms, including ethylene glycol, 1,2-propylene glycol, 1,3-propylene glycol, 1,4-butylene glycol, 1,5-pentanediol, 1,7-heptanediol, and the like. Other glycols may include polyoxyalkylene glycols and water-soluble mono-alkyl ethers of glycols and polyoxyalkylene glycols, polyoxyalkylene glycols such as polyoxyethylene glycols and polyoxypropylene glycols, monoalkyl ethers of glycols include monomethyl ether of ethylene glycol, monoethyl ether of ethylene glycol, 2-propoxyethanol, monobutyl ether of ethylene glycol, monomethyl ether of propylene glycol, monobutyl ether of propylene glycol, monomethyl ether of diethylene glycol, monoethyl ether of diethylene glycol, monobutyl ether of diethylene glycol and the like. Other glycol ethers may include diethylene glycol monoethyl ether, dipropylene glycol monomethyl ether, tripropylene glycol monomethyl ether, ethylene glycol dibutyl ether, diethylene glycol monoethyl ether, diethyleneglycol monomethyl ether, tripropylene butyl ether, dipropylene glycol butyl ether, diethylene glycol butyl ether, butylcarbitol, dipropylene glycol methyl ether, propylene glycol n-propyl ether, propylene glycol t-butyl ether, ether, and various esters, such as ethyl lactate, propylene carbonate, butylene carbonate, and the like, and pyrrolidones.

In one or more embodiments, mutual solvents in accordance with the present disclosure may be formulated as part of a concentrated surfactant package that may be diluted during application. Mutual solvents may be incorporated into a surfactant package at at about 0.1 vol % to about 50 vol % in some embodiments, and from 0.5 vol % to 30 vol % in other embodiments.

Non-emulsifying surfactant packages in accordance with the present disclosure may be added to a wellbore fluid at a concentration of 0.1 vol % to 10 vol % of the wellbore fluid in some embodiments, and from 0.2 vol % to 3 vol % in other embodiments.

Base Fluid

Base fluids useful for preparing wellbore fluid formulations and diluting surfactant packages in accordance with the present disclosure may include at least one of fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts.

Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation, for example). In a particular embodiment, a brine may include halide or carboxylate salts of mono- or divalent cations of metals, such as cesium, potassium, calcium, zinc, and/or sodium.

Other suitable base fluids useful in methods described herein may be oil-in-water emulsions or water-in-oil emulsions in one or more embodiments. Suitable oil-based or oleaginous fluids that may be used to formulate emulsions may include a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof Base fluids in accordance with the present disclosure may be added to a surfactant package in a range of 25 vol % to 90 vol % in some embodiments, and from 40 vol % to 80 vol % in other embodiments.

EXAMPLES

In the following examples, the non-emulsion forming properties of various surfactants and packages were studied using a variation of a bottle test to measure phase separation in which a brine treated with a selected surfactant was mixed with various samples of crude oil.

Example 1

In a first example, various surfactants were assayed to determine their compatibility with selected brines and crude oil samples. During the test, 10 mL of brine treated with a specified surfactant was added to a graduated cylinder, followed by 10 mL of crude oil and incubated in a water bath set to 150° F. (66° C.). The volume of brine phase and oil phase was then monitored over time and recorded at 10 minute intervals. Phase separation was determined by dividing the initial brine volume to calculate the percentage of phase separation. For example, phase separation may be calculated as $(V_1/V_2)*100$, where $V_1$ is the volume of separated water and $V_2$ is the original volume of water contained.

Surfactants studied included sorbitan esters; nonionic surfactants; and amphoteric surfactants. Surfactant samples were mixed in calcium bromide or calcium chloride brine, and combined with crude oils A-1578 from Tatweer Bahrain; and RP 10 and FRADE from Brazil. Results of the separation tests are shown below in Tables 2 and 3.

TABLE 2

Crude Compatibility Test Results of A-1578 with single component in 13.0 ppg $CaBr_2$ brine

| Non-emulsifier | Concentration (v/vol %) | Separation (%) after 10 min | 20 min | 30 min | Appearance |
|---|---|---|---|---|---|
| sorbitan ester 0.5 vol % | 0.05 | 89 | 98 | 100 | Large droplet macroemulsion formed in aqueous phase |
|  | 0.25 | 73 | 87 | 90 | Large droplet macroemulsion formed in aqueous phase |
|  | 0.75 | 82 | 87 | 90 | Large droplet macroemulsion formed in aqueous phase |
| nonionic surfactant 0.25 vol % | 0.05 | 82 | 88 | 92 | Clear aqueous phase |
|  | 0.25 | 60 | 77 | 84 | Clear aqueous phase |
|  | 0.75 | 40 | 57 | 66 | Clear aqueous phase |
| amphoteric surfactant 0.25 vol % | 0.05 | 46 | 66 | 74 | Aqueous phase hazy in appearance |
|  | 0.25 | 8 | 24 | 38 | Aqueous phase hazy in appearance |
|  | 0.75 | 34 | 55 | 64 | Aqueous phase hazy in appearance |

TABLE 3

Crude Compatibility Test Results of FRADE with single component in 11.0 ppg $CaCl_2$ brine

| Non-emulsifier | Concentration (v/vol %) | Separation (%) after 10 min | 20 min | 30 min | Appearance |
|---|---|---|---|---|---|
| sorbitan ester 0.5 vol % | 0.05 | ~100 | ~100 | ~100 | Large droplet oil suspension formed in aqueous phase |
|  | 0.25 | ~100 | ~100 | ~100 | Large droplet oil suspension formed in aqueous phase |
|  | 0.5 | 80 | ~100 | ~100 | Large droplet oil suspension formed in aqueous phase |
| nonionic surfactant 0.25 vol % | 0.05 | 80 | 80 | 82 | Hazy aqueous phase |
|  | 0.25 | 84 | 92 | 94 | Hazy aqueous phase |
|  | 0.5 | 76 | 84 | 88 | Hazy aqueous phase |
| amphoteric surfactant 0.25 vol % | 0.05 | 72 | 80 | 84 | Hazy aqueous phase |
|  | 0.25 | 84 | 88 | 92 | Hazy aqueous phase |
|  | 0.5 | 70 | 80 | 84 | Hazy aqueous phase |

Example 2

In the next example, a surfactant package in accordance with the present disclosure (M1) was formulated from a sorbitan ester, a nonionic surfactant and an amphoteric surfactant, combined at a ratio 1:2.5:1.6. A comparative surfactant formulation (C2) was prepared from a sorbitan ester and a nonionic surfactant at a ratio of 1:3 (0.05 vol % sorbitan ester to 0.15 vol % nonionic surfactant), without an added amphoteric surfactant. Compatibility tests were conducted as discussed in Example 1. Results are show in Table 4.

TABLE 4

Non-emulsification properties of surfactant package and a comparative formulation.

| Brine | Oleaginous Fluid | Surfactant Package | Time (min) | Separation (%) | Appearance |
|---|---|---|---|---|---|
| CaBr$_2$ | A-1578 | C2 | 10 | 92 | Slightly hazy aq. phase |
| | | | 20 | 98 | Slightly hazy aq. phase |
| | | | 30 | 100 | Slightly hazy aq. phase |
| | | M1 | 10 | 99 | Slightly hazy aq. phase |
| | | 0.5 vol % | 20 | 100 | Slightly hazy aq. phase |
| | | | 30 | 100 | Slightly hazy aq. phase |
| CaCl$_2$ | A-1578 | C2 | 10 | 30 | Heavy discoloration in aq. phase |
| | | | 20 | 54 | Heavy discoloration in aq. phase |
| | | | 30 | 64 | Heavy discoloration in aq. phase |
| | | M1 | 10 | 80 | Slight oil suspension in aq. phase |
| | | 1.0 vol % | 20 | 94 | Slight oil suspension in aq. phase |
| | | | 30 | 100 | Slight oil suspension in aq. phase |
| CaCl$_2$ | RP 10 | C2 | 10 | 68 | Heavy discoloration in aq. phase |
| | | | 20 | 80 | Heavy discoloration in aq. phase |
| | | | 30 | 88 | Slight discoloration |
| | | M1 | 10 | 80 | Slightly hazy aqueous phase |
| | | 0.5 vol % | 20 | 94 | Slightly hazy aqueous phase |
| | | | 30 | 100 | Slightly hazy aqueous phase |
| CaBr$_2$ | FRADE | C2 | 10 | 84 | Clear aqueous phase |
| | | | 20 | 90 | Clear aqueous phase |
| | | | 30 | 92 | Clear aqueous phase |
| | | M1 | 10 | 99 | Clear aqueous phase |
| | | 0.5 vol % | 20 | 100 | Clear aqueous phase |
| | | | 30 | 100 | Clear aqueous phase |

Example 3

In the next example, a demulsifying surfactant package (M2) was studied, which contained 10 vol % of an alkyl glycoside nonionic surfactant, 1.5 vol % of a sorbitan ester surfactant, 10 vol % propylene glycol, a small amount of glycol ether mutual solvent, and a balance of water. Surfactant samples were mixed in calcium bromide or calcium chloride brine, and combined with a crude oil sample. Results of the separation tests are shown below in Table 5.

TABLE 5

Non-emulsification properties of surfactant package ECF-1864.

| Brine | Oleaginous Fluid | Surfactant Package | Time (min) | Separation (%) | Appearance |
|---|---|---|---|---|---|
| CaBr$_2$ | A-1578 | Brine | 10 | 92 | Slightly hazy aq. phase |
| | | no treatment | 20 | 98 | Slightly hazy aq. phase |
| | | | 30 | 100 | Slightly hazy aq. phase |
| | | M2 | 10 | 99 | Clear aq. phase |
| | | 0.5 vol % | 20 | 100 | Clear aq. phase |
| | | | 30 | 100 | Clear aq. phase |
| CaCl$_2$ | A-1578 | Brine | 10 | 30 | Heavy discoloration in aq. phase |
| | | no treatment | 20 | 54 | Heavy discoloration in aq. phase |
| | | | 30 | 64 | Heavy discoloration in aq. phase |
| | | M2 | 10 | 80 | Clear aq. phase |
| | | 1.0 vol % | 20 | 94 | Clear aq. phase |
| | | | 30 | 100 | Clear aq. phase |
| CaCl$_2$ | RP 10 | Brine | 10 | 68 | Heavy discoloration in aq. phase |
| | | no treatment | 20 | 80 | Heavy discoloration in aq. phase |
| | | | 30 | 88 | Slight discoloration |
| | | M2 | 10 | 80 | Clear aq. phase |
| | | 0.5 vol % | 20 | 94 | Clear aq. phase |
| | | | 30 | 100 | Clear aq. phase |
| CaBr$_2$ | FRADE | Brine | 10 | 84 | Heavy discoloration in aq. phase |
| | | no treatment | 20 | 90 | Heavy discoloration in aq. phase |
| | | | 30 | 92 | Heavy discoloration in aq. phase |
| | | M2 | 10 | 99 | Clear aq. phase |
| | | 1.0 vol % | 20 | 100 | Clear aq. phase |
| | | | 30 | 100 | Clear aq. phase |

Example 4

In the next example, the surfactant package M2 was mixed in sodium bromide, sodium chloride and zinc-calcium brine, and combined with crude oils UN1267 from Norway. Results are show in Table 6.

TABLE 6

Non-emulsification properties of ECF-1864 with a crude sample from Norway.

| Brine | Oleaginous Fluid | Surfactant Package | Time (min) | Separation (%) | Appearance |
|---|---|---|---|---|---|
| NaBr | UN 1267 | Brine no treatment | 10 | 93 | Large oil droplets remain in aq. phase |
| | | | 20 | 98 | Large oil droplets remain in aq. phase |
| | | | 30 | 100 | Large oil droplets remain in aq. phase |
| | | M2 0.5 vol % | 10 | 99 | Clear aq. phase |
| | | | 20 | 100 | Clear aq. phase |
| | | | 30 | 100 | Clear aq. phase |
| ZnCaCl$_2$ | UN 1267 | Brine no treatment | 10 | 90 | Heavy discoloration in aq. phase with oil droplets |
| | | | 20 | 95 | Heavy discoloration in aq. phase with oil droplets |
| | | | 30 | 100 | Heavy discoloration in aq. phase with oil droplets |
| | | M2 1.0 vol % | 10 | 92 | Clear aq. phase |
| | | | 20 | 97 | Clear aq. phase |
| | | | 30 | 100 | Clear aq. phase |
| NaCl | UN 1267 | Brine no treatment | 10 | 91 | Slight discoloration in aq. phase |
| | | | 20 | 94 | Slight discoloration in aq. phase |
| | | | 30 | 96 | Slight discoloration in aq. phase |
| | | M2 0.5 vol % | 10 | 93 | Clear aq. phase with a few oil droplets |
| | | | 20 | 97 | Clear aq. phase with a few oil droplets |
| | | | 30 | 100 | Clear aq. phase with a few oil droplets |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:
   emplacing a wellbore fluid into a wellbore, the wellbore fluid comprising:
      a base fluid;
      one or more sorbitan esters; and
      one or more nonionic surfactants;
   wherein the volumetric ratio of the one or more sorbitan esters to the one or more nonionic surfactants is in the range of 1:1 to 1:5,
   wherein the wellbore fluid meets at least two of the following three criteria:
   (1) Biodegradation
      a) >60% in 28 days as measured by OECD 306 or any other OSPAR-accepted marine protocols,
      b) or in the absence of valid results for such tests:
         i. >60% in 28 days as measured by OECD 301B, 301C, 301D, 301F, 310, Freshwater BODIS or
         ii. >70% in 28 days as measured by OECD 301A, 301E;
   (2) Bioaccumulation
      a) a bioconcentration factor of less than 100;
      b) log P$_{ow}$≤3 and molecular weight>700, or
      c) if the conclusion of a weight of evidence expert judgment under Appendix 3 of OSPAR Agreement 2008-5 is positive; and
   (3) Aquatic Toxicity
      a) LC$_{50}$>10 mg/l or EC$_{50}$>10 mg/l.

2. The method of claim 1, further comprising:
   contacting the wellbore fluid with an emulsion in the wellbore; and
   demulsifying the emulsion into an aqueous phase and an oleaginous phase.

3. The method of claim 1, wherein the one or more sorbitan esters are selected from one or more of a group consisting of alkoxylated sorbitan esters, polysorbates, and sorbitans esterified with mono-, di-, tri-, or tetra-esters of C8-C22 alkyl or alkenyl fatty acids.

4. The method of claim 1, wherein the one or more nonionic surfactants are alkyl glycosides of the general formula:

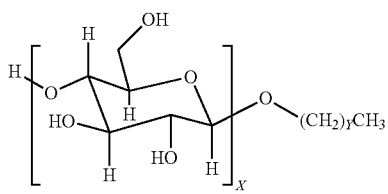

where X is a number from 1 to 4; and Y ranges from 4 to 25.

5. The method of claim 1, wherein the wellbore fluid further comprises a mutual solvent.

6. A method comprising:
contacting an emulsion with a treatment fluid, the treatment fluid comprising:
one or more sorbitan esters, and
one or more nonionic surfactants,
wherein the volumetric ratio of the one or more sorbitan esters to the one or more nonionic surfactants is in the range of 1:1 to 1:5; and
separating the emulsion into an aqueous phase and an oleaginous phase,
wherein the treatment fluid meets at least two of the following three criteria:
(1) Biodegradation
  a) >60% in 28 days as measured by OECD 306 or any other OSPAR-accepted marine protocols,
  b) or in the absence of valid results for such tests:
    i. >60% in 28 days as measured by OECD 301B, 301C, 301D, 301F, 310, Freshwater BODIS or
    ii. >70% in 28 days as measured by OECD 301A, 301E;
(2) Bioaccumulation
  a) a bioconcentration factor of less than 100;
  b) log $P_{ow} \leq 3$ and molecular weight >700, or
  c) if the conclusion of a weight of evidence expert judgment under Appendix 3 of OSPAR Agreement 2008-5 is positive; and
(3) Aquatic Toxicity
  a) $LC_{50}$>10 mg/l or $EC_{50}$>10 mg/l.

7. The method of claim 6, further comprising:
isolating the separated aqueous phase; and
injecting the separated aqueous phase into a wellbore.

8. The method of claim 6, wherein the one or more sorbitan esters are selected from one or more of a group consisting of alkoxylated sorbitan esters, polysorbates, and sorbitans esterified with mono-, di-, tri-, or tetra-esters of C8-C22 alkyl or alkenyl fatty acids.

9. The method of claim 6, wherein the one or more nonionic surfactants are alkyl glycosides of the general formula:

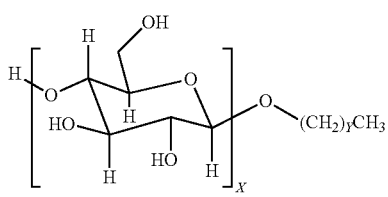

where X is a number from 1 to 4; and Y ranges from 4 to 25.

10. The method of claim 6, wherein the treatment fluid further comprises a mutual solvent.

11. The method of claim 6, wherein the treatment fluid comprises a mutual solvent at a concentration within the range of 0.1 vol % to about 50 vol %.

12. A method, comprising:
emplacing a wellbore fluid into a wellbore, the wellbore fluid comprising:
a base fluid;
a surfactant package comprising:
one or more sorbitan esters present in the surfactant package in an amount ranging from about 5 to about 50 vol % of the surfactant package; and
one or more nonionic surfactants present in the surfactant package in an amount ranging from about 50 to about 95 vol % of the surfactant package, the one or more nonionic surfactants comprising at least an alkyl glycoside of the general formula:

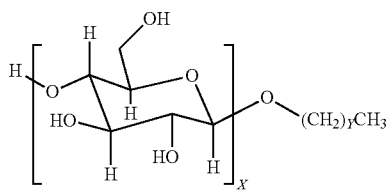

where X is a number from 1 to 4; and Y ranges from 4 to 25.

13. The method of claim 12, wherein the wellbore fluid meets at least two of the following three criteria:
(1) Biodegradation
  a) >60% in 28 days as measured by OECD 306 or any other OSPAR-accepted marine protocols,
  b) or in the absence of valid results for such tests:
    i. >60% in 28 days as measured by OECD 301B, 301C, 301D, 301F, 310, Freshwater BODIS or
    ii. >70% in 28 days as measured by OECD 301A, 301E;
(2) Bioaccumulation
  a) a bioconcentration factor of less than 100;
  b) log $P_{ow} \leq 3$ and molecular weight >700, or
  c) if the conclusion of a weight of evidence expert judgment under Appendix 3 of OSPAR Agreement 2008-5 is positive; and
(3) Aquatic Toxicity
  a) $LC_{50}$>10 mg/l or $EC_{50}$>10 mg/l.

14. The method of claim 12, further comprising:
contacting the wellbore fluid with an emulsion in the wellbore; and
demulsifying the emulsion into an aqueous phase and an oleaginous phase.

* * * * *